Aug. 15, 1933.    S. TIJMSTRA    1,922,224
REVIVIFICATION AND PRESERVATION OF CHEMICAL SOLUTIONS
Filed Aug. 30, 1929
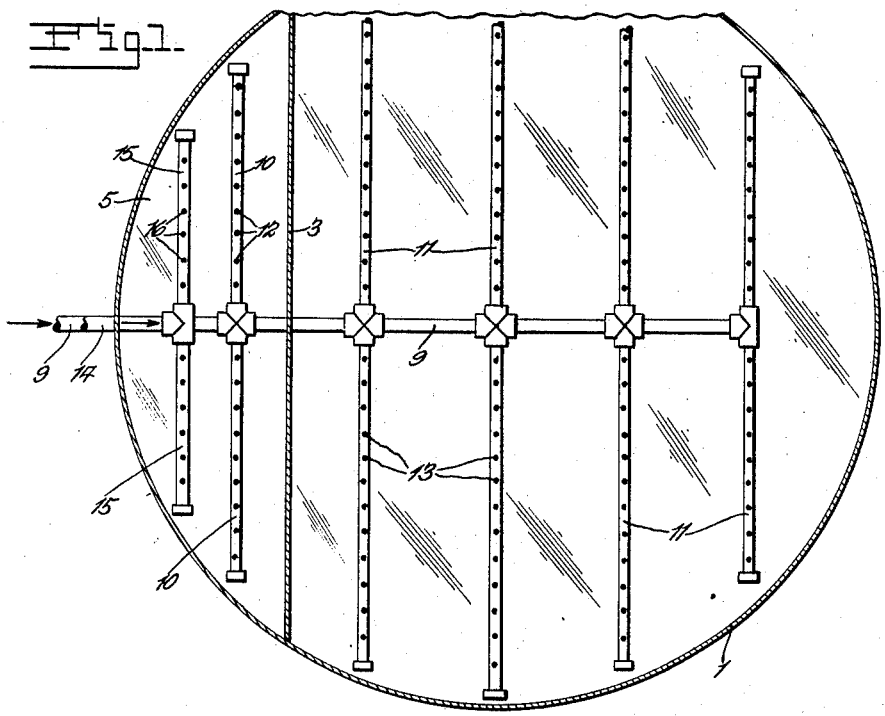
Inventor:
Sijbren Tijmstra,
by Rippey & Kingsland,
His Attorneys.

Patented Aug. 15, 1933

1,922,224

UNITED STATES PATENT OFFICE 1,922,224

REVIVIFICATION AND PRESERVATION OF CHEMICAL SOLUTIONS

Sijbren Tijmstra, Clayton, Mo., assignor to Shell Petroleum Corporation, a Corporation of Virginia Application August 30, 1929. Serial No. 389,382

6 Claims. (Cl. 23—64)

This invention relates to the revivification and preservation of chemical solutions.

Heretofore in practice, it has been usual to keep a sodium bicarbonate solution, commonly used as a fire extinguishing liquid, in open tanks. The solution breaks down under these conditions after a period of time into sodium carbonate and carbon-dioxide which deteriorates the solution for use as a fire extinguishing liquid. In order to revivify the sodium carbonate solution, it is necessary to set up a special set of conditions so that a partial pressure of carbon-dioxide in the vapor phase is maintained above the deteriorated solution. The partial pressure of the carbon-dioxide is to be maintained at somewhat more than 0.4 atmosphere at 100° F. To accomplish this condition satisfactorily, it is necessary that the deteriorated solution should be revivified in a tank from which air has been excluded when the atmosphere of the carbon-dioxide and water vapor are present above the deteriorated solution without any air. The partial pressure of carbon-dioxide in such case can be about 1.0 atmosphere absolute without having any gage pressure. Were it attempted to merely inject the carbon-dioxide gas into a gas-type tank, it would be impossible to obtain the required pressure for the absorption of the carbon-dioxide without, at the same time, raising the pressure in the tank to such a degree as to damage the tank by over pressure. It has been discovered that by the method hereinafter described a satisfactory means of revivifying the deteriorated sodium carbonate solution to form a sodium bicarbonate solution may be accomplished without danger of damaging the tank either by an excess pressure to expand the walls of the tank or by a sufficiently reduced pressure to collapse the walls of the tank; and that when the solution has been revivified, it may be preserved by maintaining an atmosphere of the carbon-dioxide in contact with the surface of the liquid in the tank and that even though there is a variation in pressure, due to atmospheric conditions, the tank will be protected against outward expansion or collapse by the control means hereinafter more particularly described.

It should be understood that, while the invention is particularly applicable for the purpose of revivifying a sodium carbonate solution to form a sodium bicarbonate solution, it is also applicable in all cases where it is desired to revivify a deteriorated solution by the absorption of a gas.

The general object of the invention is, therefore, to provide an improved method for revivifying and preserving chemical solutions that deteriorate in the receptacles or vessels in which the solutions are kept.

Other objects will appear from the following description, reference being made to the accompanying drawing wherein I have illustrated an appropriate apparatus for the practice of the present invention and in which—

Fig. 1 is a cross sectional view of a tank containing the solution and equipped with means for the practice of the invention.

Fig. 2 is a side elevation of the tank with the parts shown in section.

The tank shown in the drawing is a gas-tight tank including a side wall 1 and a top wall 2, forming the impervious walls of an enclosure for confining the solution. A vertical transverse wall 3 extends across one of the lateral portions of the tank and has its side edge imperviously united with the wall 1. The lower edge of the wall 3 is separated from the bottom of the tank by a space 4 through which the solution may pass into and out of the space 5 between the walls 1 and 3. A top wall 6 forms an impervious connection with the walls 1 and 3 and constitutes the top wall of the enclosed space 5. A by-pass pipe 7 has one end opening through the wall 1 above the wall 6 and has its other end opening into the space 5 closely below the wall 6 and is controlled by a valve 8 whereby the passage of the gas through said pipe 7 may be controlled.

A pipe 9 extends through the wall 1 and opens into branch pipes 10 extending in opposite directions therefrom. These branch pipes 10 are between the wall 1 and the vertical plane of the wall 3 and, as shown, are below the plane of the lower edge of said wall 3, being opposite the space 4. The pipe 9 extends through the space 4 and into the main portion of the tank and opens into a series of laterally extended pipes 11. The pipes 10 have through their upper sides a number of outlet openings 12 and the pipes 11 have through their upper sides numerous outlet openings 13.

Another pipe 14 extends through the wall 1 of the tank and into the space 5 and opens into a pair of oppositely extended pipes 15, having through their upper sides numerous outlet openings 16.

The top wall 2 of the tank is conical and at its apex has an outlet pipe 17 which may be opened and closed by manipulation of a valve 18.

A vertical pipe 19 opens into the tank through the lower portion of the top wall 2 and extends downwardly at the outer side of the wall 1 and opens into a surge tank 20 which is designed and adapted to contain a quantity of water. The tank 20 opens into a laterally extended pipe 21 communicating with the vertical pipe 22, which opens at its upper end into a surge tank 23 that is open at the top. The tank 20 is equipped at its side with a glass gage tube 24, of familiar construction, which will visually indicate the amount and condition of water in the tank 20. The pipes 21 and 22 open into the lower and upper ends, respectively, of the tube 25 of a glass gage, of familiar construction, which will visually indicate the heighth to which the water extends in the pipe 22. The pipe 19 has a lateral outlet pipe 26 equipped with a valve 27 whereby any portions of the contents of the pipe 19 above the pipe 26 may be withdrawn for inspection or other purposes.

The tube 28 of a glass gage has its lower end opening through the tank wall 1 below the normal level of the liquid or solution in said tank, and its upper end opening into the top wall 2 above the normal level of the liquid or solution in said tank. The normal level of the liquid or solution within the tank is approximately at the line 29. The pipe 19 is equipped with a valve 30 above the opening to the pipe 26. The valve 30 may be operated to open or to close the pipe 19, as desired.

In practicing the invention by the apparatus described, the solution may be introduced into the tank through the pipe 17 or other suitable connection so that it completely fills the space 5 and the greater portion of the main tank, the surface of the solution being, for illustration, approximately at the line 29.

The valves 8, 27 and 30 are closed and the valve 18 is opened. Next a gas is forced through the pipe 14 and into the branch pipes 15 and into the space 5 through the openings 16 in said pipes 15. The gas will rise to the top of the space 5 and eject from the space 5 the solution contained therein, the solution being forced from said space 5 through the opening 4 to the main tank.

The amount of solution thus ejected from the space 5 is more than, or at least equal to, the amount required to fill the space in the main tank above the line 29. Accordingly, as the solution is forced from the space 5 it is caused to overflow through the pipe 17, thus at once indicating to the operator that a sufficient amount of solution has been ejected from the space 5 completely to fill the tank. Thereupon the valve 18 is closed, and the introduction of the gas through the pipe 14 is reduced sufficiently that only a slight pressure will be maintained in the tank. It is now clear that all air has been forced from the space in the top of the tank and that the tank contains only the solution and the gas under a slight degree of pressure.

Next, the by-pass valve 8 is opened and the gas is caused to flow through the pipe 7 into the upper portion of the tank. This causes the chemical solution to flow from the main tank through the opening 4 into the space 5, so that as the level of the solution in the main tank becomes lowered, the space in the main tank above the level of the solution is filled with the gas.

When the upper part of the tank has thus been filled with an atmosphere of gas, the absorption of the gas by the liquid progresses throughout the contacting surface of the liquid with the gas. Thus, the pressure in the tank tends to reduce. The supply of gas through the pipe 14 is now discontinued and the major supply is provided through the pipe 9 and the branch pipes 10 and 11, the gas being injected through the body of the liquid.

As the process of revivifying the solution usually requires a considerable length of time, means are provided for preventing damage to the tank either by an excess pressure or by a reduced pressure. It is impractical to control the rate of flow of the gas so that it may be coordinated exactly with the rate of absorption, therefore an over or under pressure in the tank may result during the course of the revivifying operation. To protect the tank, therefore, against damage, means are provided for controlling the pressure in the tank by relieving excess pressure generated by the gas or by supplying a lack of pressure by reason of insufficient supply of gas.

In order to accomplish this result, the valve 30 in the pipe 19 is opened, and the surge tank 20 and its connections are brought into operation.

The surge tank 20 and its connection constitute a safety device to prevent over or under pressure in the tank 1. In practice, a sufficient quantity of water or other fluid under normal conditions accumulates in the bottom of the tank 20, to approximately the depth indicated in Fig. 2 of the drawing. That is to say, a sufficient level of liquid is maintained in the tank to constitute a seal when pressure does not exceed or fall below the predetermined pressure for the tank 1. If the pressure in the tank 1 exceeds a desired degree, the liquid is forced from the tank 20 into the line 22 and into the open tank 23 and the excess pressure will be relieved by the fluid pressure bubbling through the liquid in the tank 23. When the pressure again returns to normal, the liquid will flow by gravity into the bottom of the tank 20. If the pressure in the tank 1 reduces below the predetermined minimum, air will be drawn through the liquid seal in the bottom of the tank 20 by suction and will thereupon enter the tank and relieve the reduced pressure. It is, of course, not desirable to permit the accumulation of any substantial amount of air in the tank 1 above the liquid and, if an undue amount does accumulate, it may be driven out of the tank by the operation above described for relieving the tank of air.

The surge tank 20 and its connections thus avoid the danger of the pressure in the tank 1 becoming less than atmospheric and remaining at less than atmospheric pressure. For, it is clear that should the pressure in the tank 1 become less than approximately 0.95 atm. absolute, the water will be withdrawn from the open top tank 23 and the pipe 22 and discharged into tank 20, and a sufficient amount of atmosphere will be admitted to the main tank through tank 23 to reduce the pressure differential between the main tank 1 and the atmosphere. The surge tanks also prevent the formation in the main tank of a pressure more than approximately 0.1 atm. above atmospheric, for when the pressure in the main tank becomes more than that stated, such pressure will force the water from the tank 20 through the pipe 22 into the surge tank 23 and the excess gas will be discharged through the water in tank 23 into the atmosphere, thus reducing the pressure in the main tank. The gages 24 and 25 indicate these conditions.

It should be understood that, after the solution has once been completely revivified, the supply of gas is then discontinued except for intermittent admission of gas to supply any leakage and the liquids remain stored in the main tank. Atmospheric conditions tend to cause a variation in the tank pressure and the surge tanks continue to function even after the supply of gas is discontinued. The surge tank and connections are adjusted, however, so that slight variations in pressure will not cause either the ingress of air nor the egress of the gas, as the surge tank is designed to operate between predetermined limits of pressure as will be readily understood from the foregoing description.

I claim:

1. The method of causing absorption of a gas by a liquid which includes confining the liquid in a tank, venting the tank at the top, introducing and confining the gas below the level of the liquid in a sealed chamber in communication with the liquid in the tank near the bottom of the chamber to cause the level of the liquid to rise to the top of the tank thus ejecting from the top of the tank the air which was originally contained therein above the original level of the liquid, and sealing the vent.

2. The method of causing absorption of a gas by a liquid which includes confining the liquid in a tank, venting the tank at the top, introducing and confining the gas below the level of the liquid in a sealed chamber in communication with the liquid in the tank near the bottom of the chamber to cause the level of the liquid to rise to the top of the tank thus ejecting from the top of the tank the air which was originally contained therein above the liquid level of the liquid, sealing the vent, releasing the confined gas from the chamber and permitting it to flow to the top of the liquid.

3. The method of causing absorption of a gas by a liquid which include confining the liquid in a tank, venting the tank at the top, introducing and confining the gas below the level of the liquid in a sealed chamber in communication with the liquid in the tank near the bottom of the chamber to cause the level of the liquid to rise to the top of the tank thus ejecting from the top of the tank the air which was originally contained therein above the original level of the liquid, sealing the vent, and thereafter as the absorption continues introducing gas into the tank in sufficient quantity to compensate for that absorbed.

4. The method of treating sodium carbonate solution with carbon dioxide which includes confining the said solution in a tank, venting the tank at the top, introducing and confining the carbon dioxide in vapor phase below the level of the liquid in a sealed chamber in communication with the solution in the tank near the bottom of the chamber to cause the level of the solution to rise to the top of the tank, thus ejecting from the top of the tank the air which was originally contained therein above the level of the solution, and sealing the vent.

5. The method of treating sodium carbonate solution with carbon dioxide which includes confining the solution in a tank, venting the tank at the top, introducing and confining the carbon dioxide in vapor phase below the level of the liquid in a sealed chamber in communication with the liquid in the tank near the bottom of the chamber to cause the level of the liquid to rise to the top of the tank, thus ejecting from the top of the tank the air originally confined therein above the level of the solution, sealing the vent, releasing the confined carbon dioxide from the chamber, and permitting it to flow to the top of the solution.

6. The method of treating sodium carbonate solution with carbon dioxide which includes confining the solution in a tank, venting the tank at the top, introducing and confining carbon dioxide in vapor phase below the level of the liquid in a sealed chamber in communication with the liquid in the tank near the bottom of the chamber to cause the level of the solution to rise to the top of the tank, thus ejecting from the top of the tank the air which was originally contained therein above the original level of the liquid, sealing the vent, and thereafter as absorption of the carbon dioxide continues introducing further carbon dioxide into the tank in sufficient quantity to compensate for that absorbed.

SIJBREN TIJMSTRA.